(12) United States Patent
Friesen

(10) Patent No.: US 7,604,068 B1
(45) Date of Patent: Oct. 20, 2009

(54) FORWARDLY FOLDING TOOL BAR

(75) Inventor: Milford E. Friesen, Douglas, NE (US)

(73) Assignee: Arlyn E. Friesen, Loup City, NE (US)

(*) Notice: Subject to any disclaimer, the term of this patent is extended or adjusted under 35 U.S.C. 154(b) by 452 days.

(21) Appl. No.: 11/358,613

(22) Filed: Feb. 21, 2006

Related U.S. Application Data

(60) Provisional application No. 60/655,734, filed on Feb. 24, 2005.

(51) Int. Cl.
*A01B 49/00* (2006.01)

(52) U.S. Cl. .................... 172/311; 172/456

(58) Field of Classification Search .......... 172/311, 172/456, 466, 132, 776, 677, 452, 457, 470, 172/481, 669, 397, 407, 458, 467, 315, 316, 172/329, 509; 56/228, 134, 159; 111/54, 111/55, 57
See application file for complete search history.

(56) References Cited

U.S. PATENT DOCUMENTS

| | | | | |
|---|---|---|---|---|
| 3,333,645 A * | 8/1967 | Gustafson | .................. | 172/456 |
| 3,491,836 A * | 1/1970 | Doepker | .................. | 172/311 |
| 3,620,550 A * | 11/1971 | Hornung | .................. | 172/311 |
| 3,654,999 A * | 4/1972 | Fischer | .................. | 172/311 |
| 3,880,241 A * | 4/1975 | Vincent | .................. | 172/311 |
| 4,126,187 A * | 11/1978 | Schreiner et al. | ............ | 172/311 |
| 4,138,134 A * | 2/1979 | Lechler et al. | .............. | 172/311 |
| 4,646,851 A * | 3/1987 | Duello | .................. | 172/776 |
| 5,113,956 A | 5/1992 | Friesen | .................. | 172/311 |
| 5,488,996 A * | 2/1996 | Barry et al. | .................. | 172/311 |
| 5,752,375 A * | 5/1998 | Tonutti | .................. | 56/365 |
| 5,839,516 A * | 11/1998 | Arnold et al. | ............... | 172/456 |
| 6,082,467 A | 7/2000 | Friesen | .................. | 172/630 |
| 6,205,937 B1 * | 3/2001 | Shoup | .................. | 111/54 |
| 6,206,105 B1 | 3/2001 | Friesen | .................. | 172/311 |
| 6,415,873 B1 * | 7/2002 | Hudgins | .................. | 172/311 |
| 6,702,035 B1 | 3/2004 | Friesen | .................. | 172/311 |
| 6,902,010 B2 * | 6/2005 | Shoup | .................. | 172/456 |
| 2004/0050563 A1 * | 3/2004 | Shoup | .................. | 172/311 |
| 2005/0087350 A1 * | 4/2005 | Bauer | .................. | 172/311 |

* cited by examiner

*Primary Examiner*—Robert E Pezzuto
*Assistant Examiner*—Matthew D Troutman
(74) *Attorney, Agent, or Firm*—Dennis L. Thomte; Thomte Patent Law Office LLC

(57) ABSTRACT

A forwardly folding tool bar which may be moved between field and transport positions. The tool bar includes a center tool bar section having a hinged telescopic tongue extending forwardly therefrom for connection to a tractor. Right and left wrap-around winglet tool bar sections are pivotally secured to the right and left ends of the center tool bar section and are pivotally movable between field and transport positions. Right and left wing hinges are also pivotally secured to the center tool bar section. Right and left intermediate hinge sections are pivotally secured to the outer ends of the right and left hinge sections, respectively. Right and left outer hinge sections are pivotally secured to the outer ends of the right and left intermediate hinge sections. Inner, intermediate and outer tool bar sections are secured to each of the inner, intermediate and outer hinge sections.

5 Claims, 5 Drawing Sheets

FORWARDLY FOLDING TOOL BAR

CROSS-REFERENCE TO RELATED APPLICATION

This application claims the benefit of U.S. Provisional Application Ser. No. 60/655,734 entitled FORWARDLY FOLDING TOOL BAR filed Feb. 24, 2005, the disclosure of which is hereby incorporated herein by reference.

BACKGROUND OF THE INVENTION

1. Field of the Invention

This invention relates to a folding tool bar and more particularly to a forwardly folding tool bar. More particularly, the invention relates to a tool bar which has a wider operating width than any such device available on the market to date.

2. Description of the Related Art

Tool bars are commonly used in farming operations. The conventional tool bars normally consist of a transversely extending tool bar or frame member having a tongue or hitch secured thereto which extends forwardly therefrom for attachment to a prime mover such as a tractor. Attachments such as cultivators, planter units, stalk cutters, etc., are mounted on the tool bar to perform various farming operations. A major problem associated with conventional tool bars is that the working or field width thereof must be substantially reduced to enable the implement to be transported from one location to another. Many types of tool bars employ a center tool bar section having wing tool bar sections extending outwardly therefrom. In certain of the prior art tool bars, the wings are pivoted from a substantially horizontal working field position to an upright transport position. In most folding tool bars of this type, the upright position of the wings is not as stable as desired and may create undesirable stress on certain components of the tool bar.

A further problem associated with the conventional folding tool bars is that they are not sufficiently flexible to compensate for irregular terrain such as in hill country, terraces, etc. Yet another disadvantage of the prior art devices is that the wheels which support the tool bar interfere with the mounting of various attachments on the tool bar due to the location of the wheels on the tool bar. Still another disadvantage of the conventional prior art tool bars is that they are difficult to move from the field position to the transport position and vice versa.

Many of the problems associated with the prior art tool bars were solved by the forwardly folding tool bar of applicant's U.S. Pat. No. 5,113,956 which issued May 19, 1992. Although the tool bar of U.S. Pat. No. 5,113,956 has experienced considerable commercial success, the need exists to reduce the number of structural elements, and hence reduce the cost thereof, without sacrificing strength, heft, performance, durability, aesthetics, etc.

In applicant's U.S. Pat. No. 6,206,105, which issued Mar. 27, 2001, a novel forwardly folding tool bar is described which represented a significant advance in the art. In applicant's U.S. Pat. No. 6,702,035, which issued Mar. 9, 2004, a further advancement in the forwardly folding tool bar art is disclosed. Although the tool bar disclosed in U.S. Pat. No. 6,702,035 truly represents a significant advance in the art, the need has developed to create a tool bar which has a wider operating width than any such device available on the market to date while yet having a transport width which enables the tool bar to be moved on a highway or the like.

SUMMARY OF THE INVENTION

It is believed that the forward folding tool bar of this invention has a wider operating width than any such device available on the market to date. The folding tool bar of this invention comprises an elongated, transversely extending center tool bar section which has opposite ends and rearward and forward sides. The center tool bar section has four pairs of vertically movable gauge wheels secured thereto which are positioned forwardly thereof. A telescopic tongue extends forwardly from a support on the center tool bar section and has a three-point hitch at its forward end. The forwardly extending telescopic tongue has a pivotal flex point intermediate the length thereof which permits a few degrees of flexibility to the tongue. A pair of vertically movable gauge wheels are secured to the tongue intermediate the length thereof. A pair of wrap-around winglet tool bar sections are pivotally secured to the opposite ends of the center tool bar section, about vertical axes, to enable the winglet tool bar sections to be pivotally moved between field and transport positions with respect to the center tool bar section. The winglet tool bar sections are pivotally movable by means of hydraulic cylinders attached thereto. The center tool bar section is designed so as to be able to support six row units thereon spaced thirty inches apart. The winglet tool bar sections have a length sufficient to as to be able to each support two row units thereon. The inner ends of a pair of wing hinges are hingedly secured to the support on the center tool bar section. The inner ends of a pair of intermediate wing sections are hingedly secured, about horizontal axes, to the other ends of the pair of wing hinges. A first load transfer hydraulic cylinder is pivotally connected to and extends between the outer end of one wing hinge and the inner end of one of the intermediate wing sections. A second load transfer hydraulic cylinder is pivotally connected to and extends between the outer end of the other wing hinge and the inner end of the other intermediate wing section. The load transfer hydraulic cylinders are designed so as to float when the tool bar of this invention is in its field position and are designed to prevent hinged movement between the tool bar sections when the tool bar is in its transport position. An outer wing section is hingedly secured, about a horizontal axis, to the outer end of each of the intermediate wing sections. Intermediate and outer tool bar sections are secured to the intermediate and outer wing sections at a position rearwardly of the wing sections. The intermediate tool bar sections and the outer tool bar sections each have a pair of gauge wheels secured thereto and extending downwardly therefrom. A first pair of draft tubes have their rearward ends pivotally secured to the intermediate wing sections and have their forward ends pivotally secured to the forward end of the tongue. A pair of auxiliary draft tubes have their forward ends pivotally and slidably connected to the draft tubes and have their rearward ends pivotally secured to the outer ends of the intermediate wing sections.

When the tool bar of this invention is in its field position, the telescopic tongue is in its retracted position. When the tool bar of this invention is in its transport position, the telescopic tongue is in its extended position. When the tool bar is in its transport position, the right wing hinge, right intermediate wing section, the right outer wing section, the right intermediate tool bar section, and the right outer tool bar section are positioned at the right side of the tongue and the left wing hinge, left intermediate wing section, the left outer wing section, the left intermediate tool bar section, and the left outer tool bar section are positioned at the left side of the tongue. The gauge wheels on the outer and intermediate tool bar sections are elevated above the ground.

It is therefore a principal object of the invention to provide an improved forward folding tool bar.

Still another object of the invention is to provide a forward folding tool bar which has a wider operating width than any such device available on the market to date.

Yet another object of the invention is to provide a forward folding tool bar which is flexible in its field position to accommodate rolling terrain and which is flexible in its transport position to accommodate ease of ingress and egress of fields and farmsteads having unlevel entrances.

Still another object of the invention is to provide a forward folding tool bar of the type described which at the same time is more narrow of transport width than any such device on the market to date which has an operating width that is greater than sixty-six feet.

Still another object of the invention is to provide a forward folding tool bar for use in planting, seeding or fertilizing operations for agricultural crop production.

Yet another object of the invention is to provide a forward folding tool bar having a one hundred twenty foot operating width.

Still another object of the invention is to provide a forward folding tool bar of the type described which can accommodate central seed transfer systems provided by manufacturers of planting equipment.

Yet another object of the invention is to provide a forward folding tool bar of the type described which when utilizing the central fill systems can accommodate ultra-narrow row spaces such as 20 inches and 22 inches, in addition to 30-inch row spaces.

Yet another object of the invention is to provide a tool bar having an operating width of 120 feet which, with the utilization of intermediate tongue carry wheels, results in efficiency of manufacture.

Yet another object of the invention is to provide a forward folding tool bar which is economical of manufacture, durable in use and refined in appearance.

These and other objects will be apparent to those skilled in the art.

DETAILED DESCRIPTION OF THE INVENTION

Figure 1:
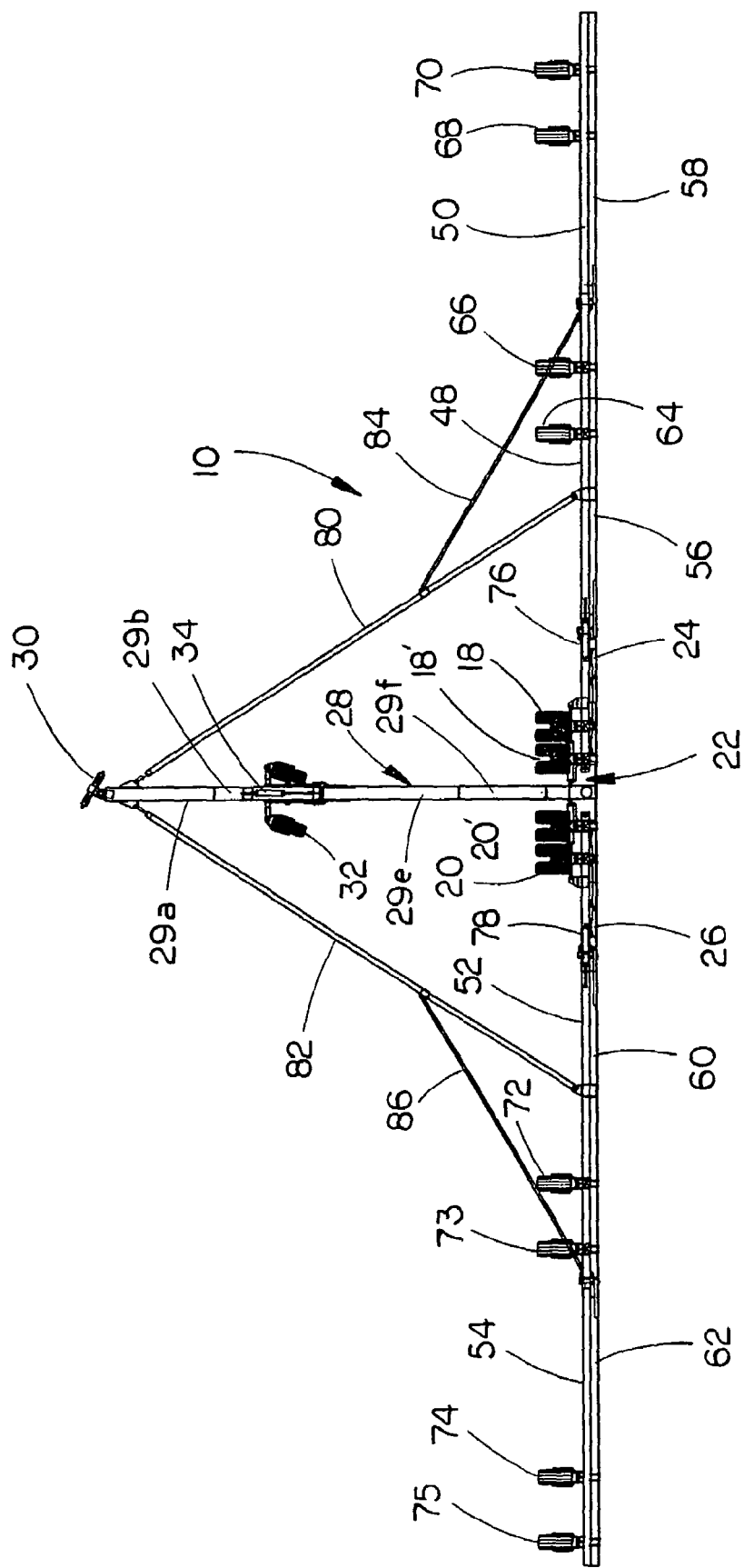
FIG. 1 is a top view of the folding tool bar of this invention in its field position.
Figure 2:
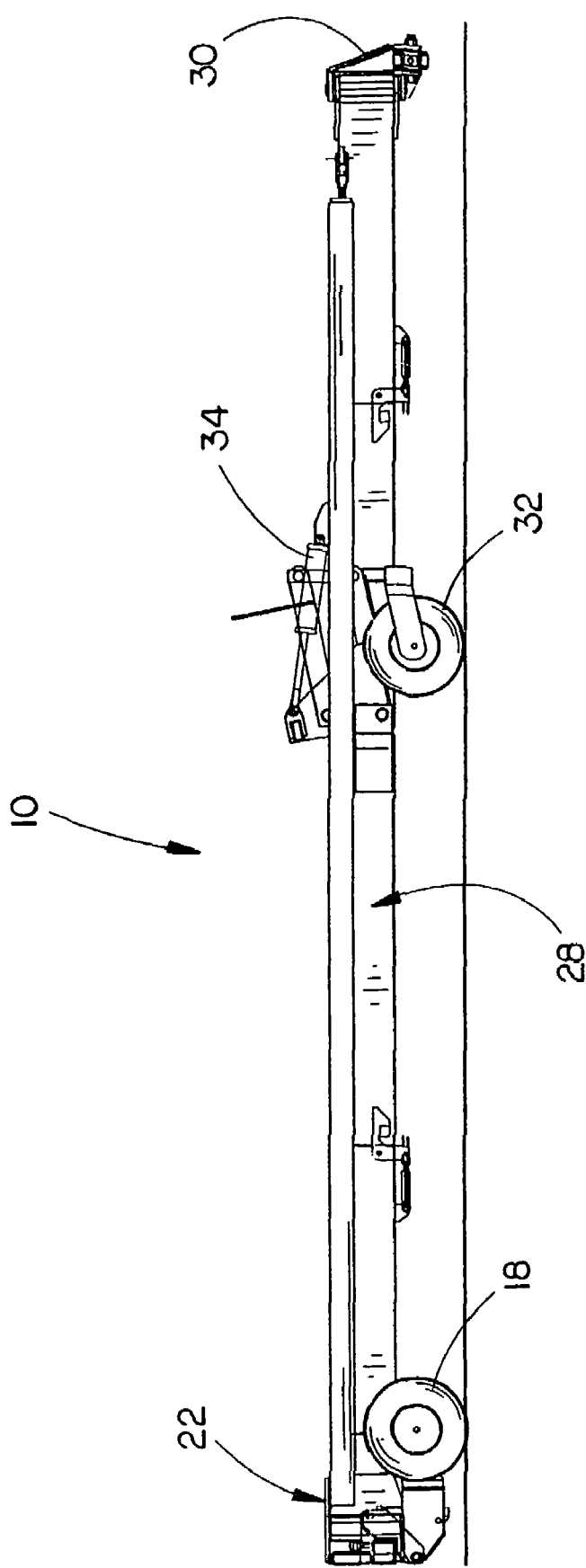
FIG. 2 is a partial side view of the tool bar of FIG. 1 in the field position.
Figure 4:
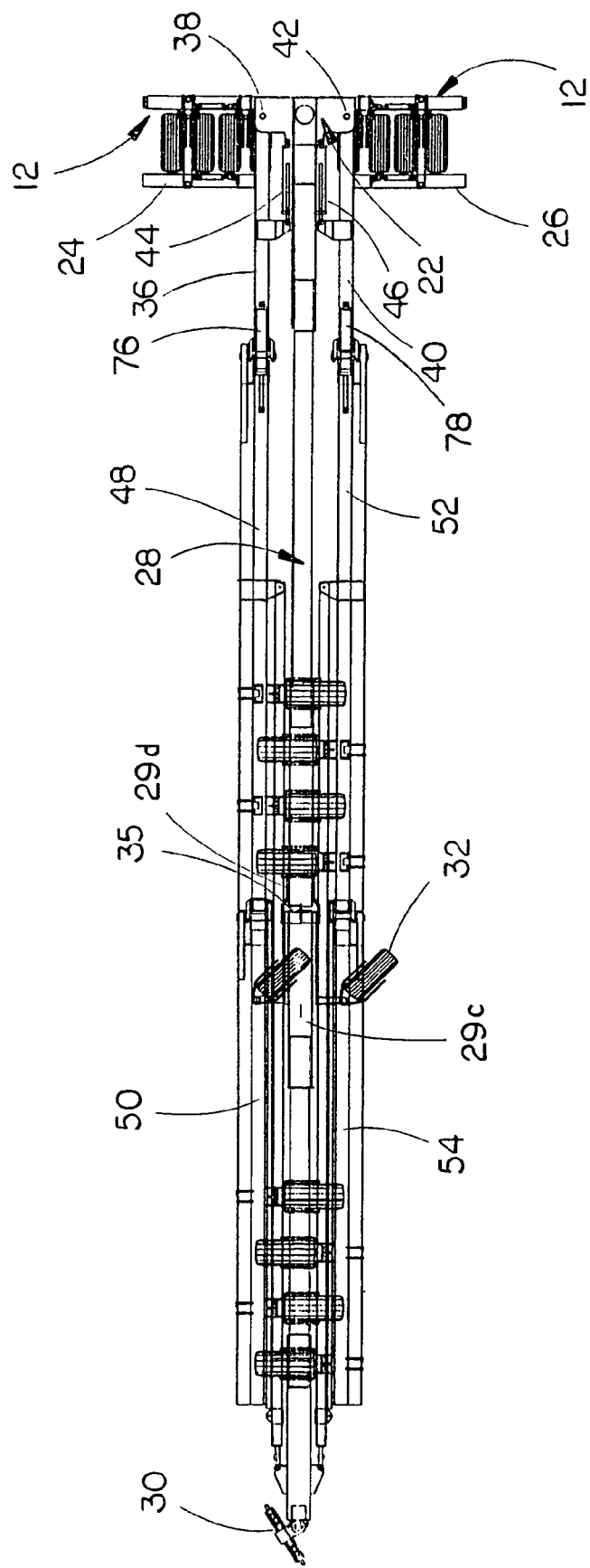
FIG. 4 is a top view of the tool bar in its transport position.
Figure 5:
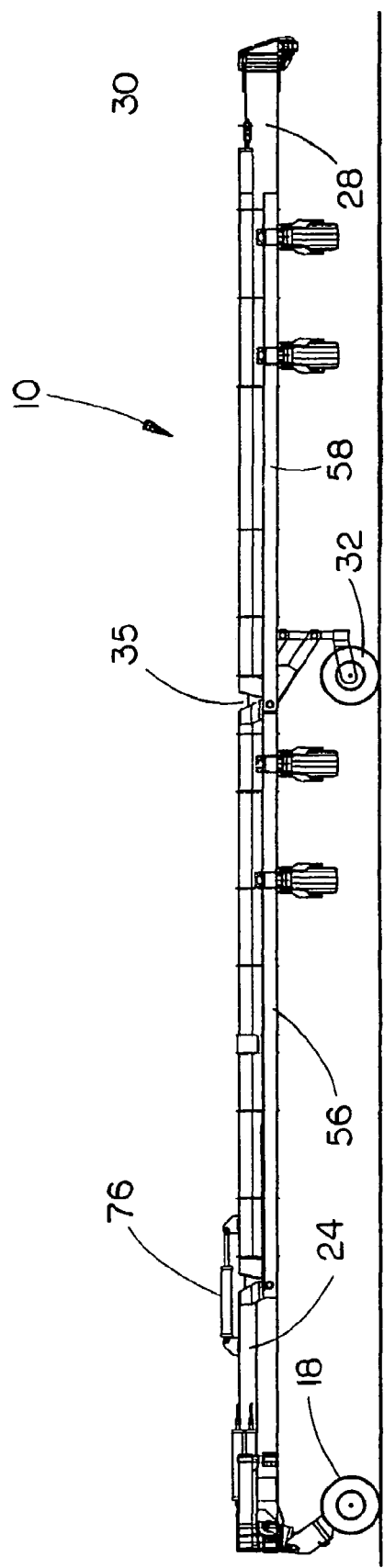
FIG. 5 is a partial side view of the tool bar in its transport position.

The numeral 10 refers to the forward folding tool bar of this invention. The tool bar 10 includes a center tool bar section 12 having a right end 14 and a left end 16. Preferably, center tool bar section 12 has a length of 165.0 inches and is adapted to have row units such as planters, cultivators, etc., mounted thereon in conventional fashion. Preferably, center tool bar section 12 supports six rows of planters thereon which are spaced-apart at a distance of thirty inches. Four pairs of vertically movable gauge wheel assemblies 18, 18', 20 and 20' are secured to the center tool bar section 12 in conventional fashion for raising and lower the center tool bar section in conventional fashion. Support means 22 is secured to the center tool bar section at the center thereof and may comprise vertically spaced-apart plates such as in U.S. Pat. No. 6,702,035. A pair of wrap-around winglet tool bar sections 24 and 26 are pivotally secured to the ends 14 and 16 of center tool bar section 12, about vertical axes, to enable the sections 24 and 26 to be pivotally movable between field and transport positions such as illustrated in FIGS. 1 and 4, respectively. The sections 24 and 26 are pivotally movable by means of hydraulic cylinders attached thereto. The sections 24 and 26 preferably each have a length of 58.75 inches and are designed to support two rows of planters, cultivators, etc., spaced at thirty inches.

The numeral 28 refers to a telescopic tongue comprised of a plurality of telescopic tongue sections 29a, 29b, 29c, 29d, 29e, 29f and 29g such as described in U.S. Pat. Nos. 5,113,956 and 6,702,035 which enable the tongue 28 to be telescopically extended to so that the tool bar 10 may be moved from its field position of FIG. 1 to its transport position of FIG. 4 and to enable the tongue 28 to be retracted so that the tool bar 10 may be moved from its transport position of FIG. 4 to its field position of FIG. 1. The tongue 28 has a three-point hitch 30 at its forward end which may be attached to the three-point hitch of a tractor to enable the forward end of the tongue 28 to be selectively raised and lowered by the tractor three-point hitch assembly. A pair of transport wheels 32 are selectively vertically movably mounted on tongue 28 by means of hydraulic cylinder 34 and includes a conventional lock-up mechanism for use in transport. The wheels 32 are preferably pivotally secured, about a vertical axis, to tongue 28 to permit the wheels 32 to pivot or swivel 360 degrees. Tongue 28 is provided with a horizontally disposed hinge point 35 between the rearward end of tongue section 29c and the forward end of tongue section 29d, which permits the tongue 28 to flex or hinge slightly, preferably about three degrees. Thus, tongue sections 29a, 29b and 29c form a first tongue portion while tongue sections 29d, 29e, 29f and 29g form a second tongue section with the two tongue sections being able to flex or hinge with respect to one another.

Right wing hinge 36 is pivotally connected at its inner end to the forward end of support 22 by a vertically disposed float pivot pin 38. Left wing hinge 40 is pivotally connected at its inner end to the forward end of support 22 by a vertically disposed float pivot pin 42. One or more hydraulic cylinders 44 are pivotally connected to support 22 and wing hinge 36 to pivotally move wing hinge 36 between its field and transport positions. One or more hydraulic cylinders 46 are pivotally connected to support 22 and wing hinge 40 to pivotally move wing hinge 40 between its field and transport positions. When the wing hinges 36 and 40 are in their field position, they are disposed above and forwardly of center tool bar section 12.

The inner end of intermediate hinge section 48 is hingedly secured, about a horizontal axis, to the outer end of wing hinge 36. The inner end of outer hinge section 50 is hingedly secured, about a horizontal axis, to the outer end of intermediate hinge section 48. The inner end of intermediate hinge section 52 is hingedly secured, about a horizontal axis, to the outer end of wing hinge 40. The inner end of outer hinge section 54 is hingedly secured, about a horizontal axis, to the outer end of intermediate hinge section 52.

Intermediate and outer row unit-carrying tool bars 56 and 58 are positioned rearwardly of hinge sections 48 and 50, respectively, and are secured thereto by steel plates or the like similar to that shown in U.S. Pat. No. 6,702,035. Intermediate and outer row unit-carrying tool bars 60 and 62 are positioned rearwardly of hinge sections 52 and 54, respectively, and are secured thereto by steel plates or the like similar to that shown in U.S. Pat. No. 6,702,035. Preferably, ten row units, at a spacing of thirty inches, are mounted on each of tool bars 56 and 60 and nine row units, at a spacing of thirty inches, are mounted on each of tool bars 58 and 62. Preferably, the overall length of the tool bars 12, 24, 26, 56, 58, 60 and 62 is 1424.0 inches so that forty-eight row units at thirty-inch spacing may be mounted thereon.

Gauge wheel assemblies 64 and 66 are secured to tool bar 56, gauge wheel assemblies 68 and 70 are secured to tool bar 58, gauge wheel assemblies 72 and 73 are secured to tool bar 60 and gauge wheel assemblies 74 and 75 are secured to tool bar 62 in conventional fashion.

A load transport hydraulic cylinder 76 is pivotally connected to and extends between wing hinge 36 and wing section 48. Similarly, a load transport hydraulic cylinder 78 is pivotally connected to and extends between wing hinge 40 and wing section 52. The cylinders 76 and 78 will be positioned in their load transfer positions when the tool bar is in the transport position and will be in their float positions when in the field position. Draft tubes 80 and 82 have their forward ends pivotally secured to tongue 28 at the forward end thereof and have their rearward ends pivotally secured to wing sections 48 and 52, respectively. Auxiliary draft tubes 84 and 86 have their rearward ends pivotally secured to the outer ends of wing sections 48 and 52, respectively, and have their forward ends slidably and pivotally secured to draft tubes 80 and 82, respectively. Stops are provided on draft tubes 80 and 82 which limit the rearward sliding movement of the forward ends of auxiliary draft tubes 84 and 86, respectively, to prevent the wing sections from moving further rearwardly from the field position of FIG. 1.

FIG. 1 illustrates the forward folding tool bar of this invention in its field position. In the field position of FIG. 1, the tool bar sections are disposed in a substantially transversely extending and aligned fashion with the operating width of the tool bar being approximately one hundred twenty feet which is believed to be greater than any tool bar presently on the market. In the field position of FIG. 1, the gauge wheel assemblies 18, 18', 20 and 20' as well as the gauge wheel assemblies 64, 66, 68, 70, 72, 74, 72' and 74' will be vertically moved to control the vertical movement of the row units mounted on the tool bars. As stated, the field position, the hydraulic cylinders 76 and 78 will be in the float position to permit the hinge sections 48 and 52 to flex with respect to hinge sections 48 and 52, respectively. The hinge sections 50 and 52 may also flex somewhat with respect to the hinge section 48 and 54, respectively, due to the hinge connection therebetween. The tongue 28 is also permitted to flex somewhat in its field position due to the hinge point 35, as previously described. Normally, the wheels 32 connected to the tongue 28 will also be in ground engaging position. In the field position of FIG. 1, the tongue 28 will be in its retracted position and will be locked in its retracted position by a locking means similar to that disclosed in U.S. Pat. No. 6,702, 035.

Figure 3:
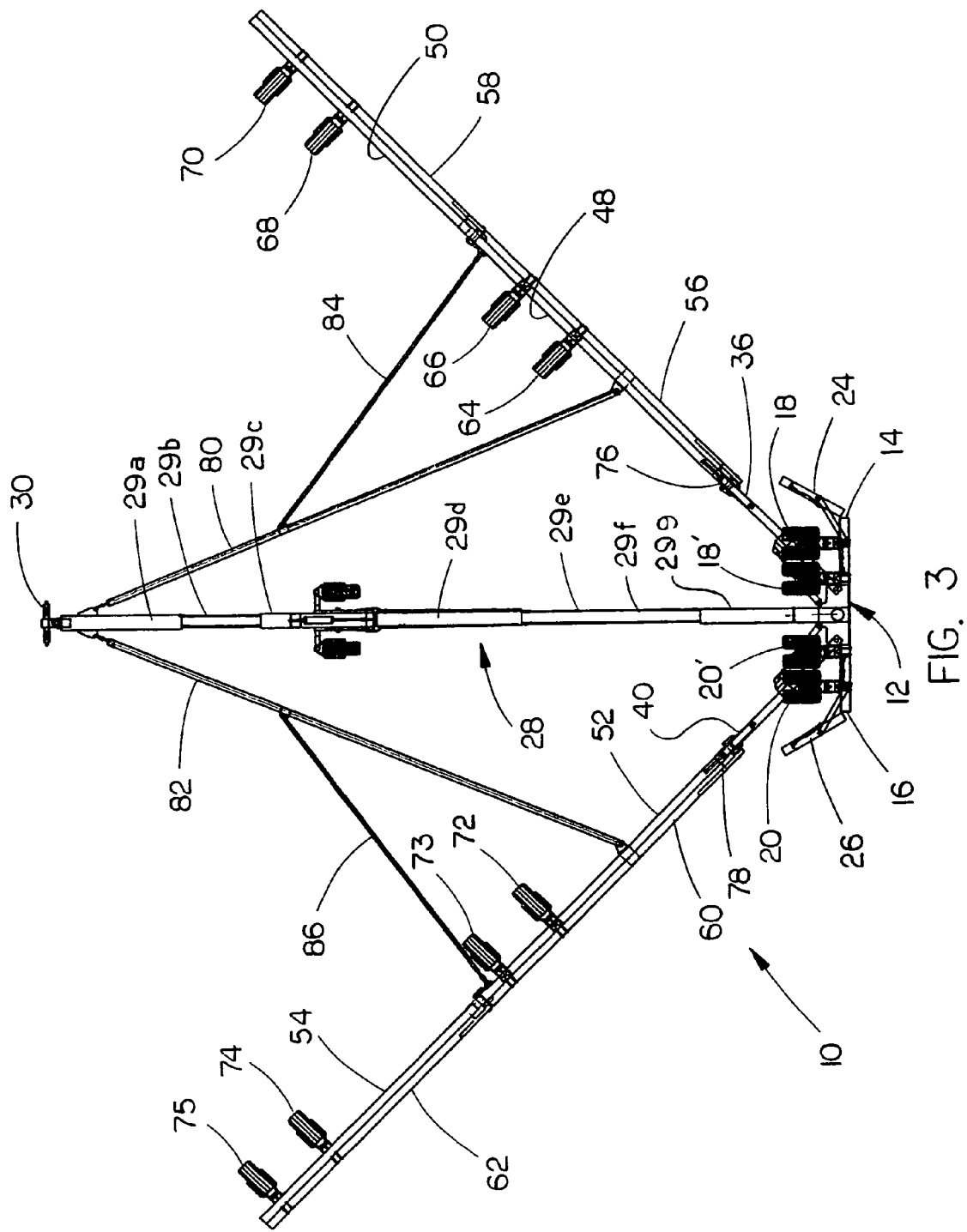
FIG. 3 is a top view of the tool bar of this invention being folded forwardly to its transport position.

When it is desired to move the tool bar 10 from its field position of FIG. 1 to the transport position of FIG. 4, the tongue assembly 28 is unlocked and the hydraulic cylinders 46 and 48 are retracted to enable the hinge sections and tool bar sections to pivotally move forwardly, as illustrated in FIG. 3, until the hinge sections and tool bar sections are positioned adjacent the tongue 28, as illustrated in FIG. 4. The tool bar 10 will normally include a means for supporting the hinge sections 50 and 54 thereon such as disclosed in U.S. Pat. No. 6,702,035 or 5,113,956. The wheel assemblies 32, 18, 18', 20 and 20' will then be operated so that the hinge sections and the wheels thereon are raised so that the wheels 64, 66, 68, 70, 72, 73, 74 and 75 are moved upwardly out of ground engagement. The upward movement just described may also be enhanced through the operation of the three-point hitch assembly on the tractor.

When the tool bar of this invention is in its transport position, the hydraulic cylinders 76 and 78 will be in their load transfer position to prevent hinged movement between the wing sections 24, 56 and 26, 70. The hinge connections between the intermediate and outer wing sections are aligned with the hinge point 35 so that a certain amount of flex is permitted therebetween during transport, thereby facilitating egress and ingress with respect to fields which may not have level entrances.

When it is desired to move the tool bar from its transport position to its field position, the procedure just described will be reversed.

Thus it can be seen that the invention accomplishes at least all of its stated objectives.

I claim:

1. A forwardly folding tool bar, comprising:

an elongated, transversely extending center tool bar section having first and second ends and rearward and forward sides;

said center tool bar section having height adjustable ground engaging wheels mounted thereon;

an elongated telescopic tongue having rearward and forward ends;

said tongue being secured at its rearward end to said center tool bar section and extending forwardly therefrom;

an elongated right wrap-around tool bar section having a first end and a second end;

said right wrap-around tool bar section being pivotally connected intermediate its length to said center tool bar section inwardly of said first end thereof and being movable between a field position to a transport position;

said right wrap-around tool bar section, when in its said field position, being parallel to said center tool bar section and extending outwardly therefrom;

said right wrap-around tool bar section, when in its said transport position, being parallel to said center tool bar section and being positioned forwardly thereof;

means for pivotally moving said right wrap-around tool bar section between its said field and transport positions;

an elongated left wrap-around tool bar section having a first end and a second end;

said left wrap-around tool bar section being pivotally connected intermediate its length to said center tool bar section inwardly of said second end thereof and being movable between a field position to a transport position;

said left wrap-around tool bar section, when in its said field position, being parallel to said center tool bar section and extending outwardly therefrom;

said left wrap-around tool bar section, when in its said transport position, being parallel to said center tool bar section and being positioned forwardly thereof;

means for pivotally moving said left wrap-around tool bar section between its said field and transport positions;

a right wing hinge having inner and outer ends;

a left wing hinge having inner and outer ends;

said inner end of said right wing hinge being pivotally secured to said center tool bar section about a vertical axis;

said inner end of said left wing hinge being pivotally secured to said center tool bar section about a vertical axis;

a right intermediate hinge section having inner and outer ends;

said inner end of said right intermediate hinge section being pivotally secured, about a horizontal axis, to said outer end of said right wing hinge;

a left intermediate hinge section having inner and outer ends;

said inner end of said left intermediate hinge section being pivotally secured, about a horizontal axis, to said outer end of said left wing hinge;

a right outer hinge section having inner and outer ends;

said inner end of said right outer hinge section being pivotally secured, about a horizontal axis, to said outer end of said right intermediate hinge section;

a left outer hinge section having inner and outer ends;

said inner end of said left outer hinge section being pivotally secured, about a horizontal axis, to said outer end of said left intermediate hinge section;

said right intermediate hinge section and said right outer hinge section being movable with said right wing hinge between said field and transport positions;

said left intermediate hinge section and said left outer hinge section being movable with said left wing hinge between said field and transport positions;

a right intermediate tool bar operatively secured to said right intermediate hinge section for movement therewith;

a left intermediate tool bar operatively secured to said left intermediate hinge section for movement therewith;

a right outer tool bar operatively secured to said right outer hinge section for movement therewith;

a left outer tool bar operatively secured to said left outer hinge section for movement therewith;

said center tool bar section, said right and left wrap-around tool bar sections, said right and left intermediate tool bars and said right and left outer tool bars adapted to have row units mounted thereon;

gauge wheels operatively secured to said right intermediate and right outer tool bars;

gauge wheels operatively secured to said left intermediate and left outer tool bars;

said tongue having a horizontally disposed pivot point rearwardly of its forward end to define a front tongue section and a rear tongue section which are pivotally connected together to permit said front and rear tongue sections to pivotally move with respect to one another; and a pair of transport wheels selectively vertically movably mounted on said front tongue section.

2. The forwardly folding tool bar of claim 1 wherein said pivotal connection between said front and rear tongue sections is horizontally aligned with the pivotal connection of said right intermediate hinge section with said right outer hinge section when said right wing hinge is in its transport position and wherein said pivotal connection between said front and rear tongue sections is horizontally aligned with the pivotal connection of said left intermediate hinge section with said left outer hinge section when said left wing hinge is in its transport position.

3. The forwardly folding tool bar of claim 1 wherein a first draft tube, having forward and rearward ends, is pivotally secured to and extends between said tongue and said right intermediate hinge section, a second draft tube, having forward and rearward ends, is pivotally secured to and extends between said tongue and said left intermediate hinge section, a first auxiliary draft tube, having forward and rearward ends, is slidably connected at its forward end to said first draft tube and is pivotally connected at its rearward end to said right intermediate hinge section, a second auxiliary draft tube, having forward and rearward ends, is slidably connected at its forward end to said second draft tube and is pivotally connected at its rearward end to said second draft tube.

4. The forwardly folding tool bar of claim 1 wherein said pair of transport wheels are also pivotally secured to said front tongue section about a vertical axis.

5. A forwardly folding tool bar, comprising:

an elongated, transversely extending center tool bar section having first and second ends and rearward and forward sides;

said center tool bar section having height adjustable ground engaging wheels mounted thereon;

an elongated telescopic tongue having rearward and forward ends;

said tongue being secured at its rearward end to said center tool bar section and extending forwardly therefrom;

a pair of transport wheels selectively vertically movably mounted on said tongue forwardly of said height adjustable around engaging wheels on said center tool bar section;

an elongated right wrap-around tool bar section having a first end and a second end;

said right wrap-around tool bar section being pivotally connected intermediate its length to said center tool bar section inwardly of said first end thereof and being movable between a field position to a transport position;

said right wrap-around tool bar section, when in its said field position, being parallel to said center tool bar section and extending outwardly therefrom;

said right wrap-around tool bar section, when in its said transport position, being parallel to said center tool bar section and being positioned forwardly thereof;

means for pivotally moving said right wrap-around tool bar section between its said field and transport positions;

an elongated left wrap-around tool bar section having a first end and a second end;

said left wrap-around tool bar section being pivotally connected intermediate its length to said center tool bar section inwardly of said second end thereof and being movable between a field position to a transport position;

said left wrap-around tool bar section, when in its said field position, being parallel to said center tool bar section and extending outwardly therefrom;

said left wrap-around tool bar section, when in its said transport position, being parallel to said center tool bar section and being positioned forwardly thereof;

means for pivotally moving said left wrap-around tool bar section between its said field and transport positions;

a right wing hinge having inner and outer ends;

a left wing hinge having inner and outer ends;

said inner end of said right wing hinge being pivotally secured to said center tool bar section about a vertical axis;

said inner end of said left wing hinge being pivotally secured to said center tool bar section about a vertical axis;

a right intermediate hinge section having inner and outer ends;

said inner end of said right intermediate hinge section being pivotally secured, about a horizontal axis, to said outer end of said right wing hinge;

a left intermediate hinge section having inner and outer ends;

said inner end of said left intermediate hinge section being pivotally secured, about a horizontal axis, to said outer end of said left wing hinge;

a right outer hinge section having inner and outer ends;

said inner end of said right outer hinge section being pivotally secured, about a horizontal axis, to said outer end of said right intermediate hinge section;

a left outer hinge section having inner and outer ends;

said inner end of said left outer hinge section being pivotally secured, about a horizontal axis, to said outer end of said left intermediate hinge section;

said right intermediate hinge section and said right outer hinge section being movable with said right wing hinge between said field and transport positions;

said left intermediate hinge section and said left outer hinge section being movable with said left wing hinge between said field and transport positions;

a right intermediate tool bar operatively secured to said right intermediate hinge section for movement therewith;

a left intermediate tool bar operatively secured to said left intermediate hinge section for movement therewith;

a right outer tool bar operatively secured to said right outer hinge section for movement therewith;

a left outer tool bar operatively secured to said left outer hinge section for movement therewith;

said center tool bar section, said right and left wrap-around tool bar sections, said right and left intermediate tool bars and said right and left outer tool bars adapted to have row units mounted thereon;

gauge wheels operatively secured to said right intermediate and right outer tool bars;

gauge wheels operatively secured to said left intermediate and left outer tool bars;

a first rigid draft tube, having forward and rearward ends, pivotally secured to and extending between said tongue and said right intermediate hinge section;

a second rigid draft tube, having forward and rearward ends, pivotally secured to and extending between said tongue and said left intermediate hinge section;

a first rigid auxiliary draft tube, having forward and rearward ends, slidably connected at its forward end to said first draft tube and pivotally connected at its rearward end to said right intermediate hinge section;

a second rigid auxiliary draft tube, having forward and rearward ends, slidably connected at its forward end to said second draft tube and pivotally connected at its rearward end to said left intermediate hinge section.

\* \* \* \* \*